United States Patent [19]

Read

[11] Patent Number: 4,497,054

[45] Date of Patent: Jan. 29, 1985

[54] ONE-FOR-N REDUNDANCY IN A DIGITAL SWITCH MATRIX

[75] Inventor: Edgar L. Read, Carrollton, Tex.

[73] Assignee: Honeywell Inc., Phoenix, Ariz.

[21] Appl. No.: 490,006

[22] Filed: Apr. 29, 1983

[51] Int. Cl.[3] .......................... H04Q 11/04; H04J 3/14
[52] U.S. Cl. .......................................... 370/58; 370/16
[58] Field of Search .................................... 370/16, 58

[56] References Cited

U.S. PATENT DOCUMENTS

| 4,064,360 | 12/1977 | Koening | 370/58 |
| 4,160,127 | 7/1979 | Siana et al | 370/16 |
| 4,160,128 | 7/1979 | Teyiez | 370/58 |
| 4,245,342 | 1/1981 | Entenman | 370/16 |
| 4,254,498 | 3/1981 | Tawara et al. | 370/16 |
| 4,266,293 | 5/1981 | Anderson et al. | 370/16 |
| 4,322,843 | 3/1982 | Beuscher et al. | 370/58 |
| 4,365,248 | 12/1982 | Bargeton et al. | 370/16 |
| 4,425,641 | 1/1984 | French et al. | 370/58 |
| 4,442,518 | 5/1984 | Morimoto et al. | 370/16 |
| 4,455,645 | 6/1984 | Mijioka et al. | 370/16 |

Primary Examiner—Douglas W. Olms
Assistant Examiner—Curt Kuntz
Attorney, Agent, or Firm—A. A. Sapelli; L. J. Marhoefer; J. S. Solakian

[57] ABSTRACT

The redundant digital switch matrix system of the present invention includes a plurality of primary digital switch elements, and incorporates a standby digital switch which can be substituted for any one of the plurality of primary digital switch elements in response to at least one select control signal.

2 Claims, 12 Drawing Figures

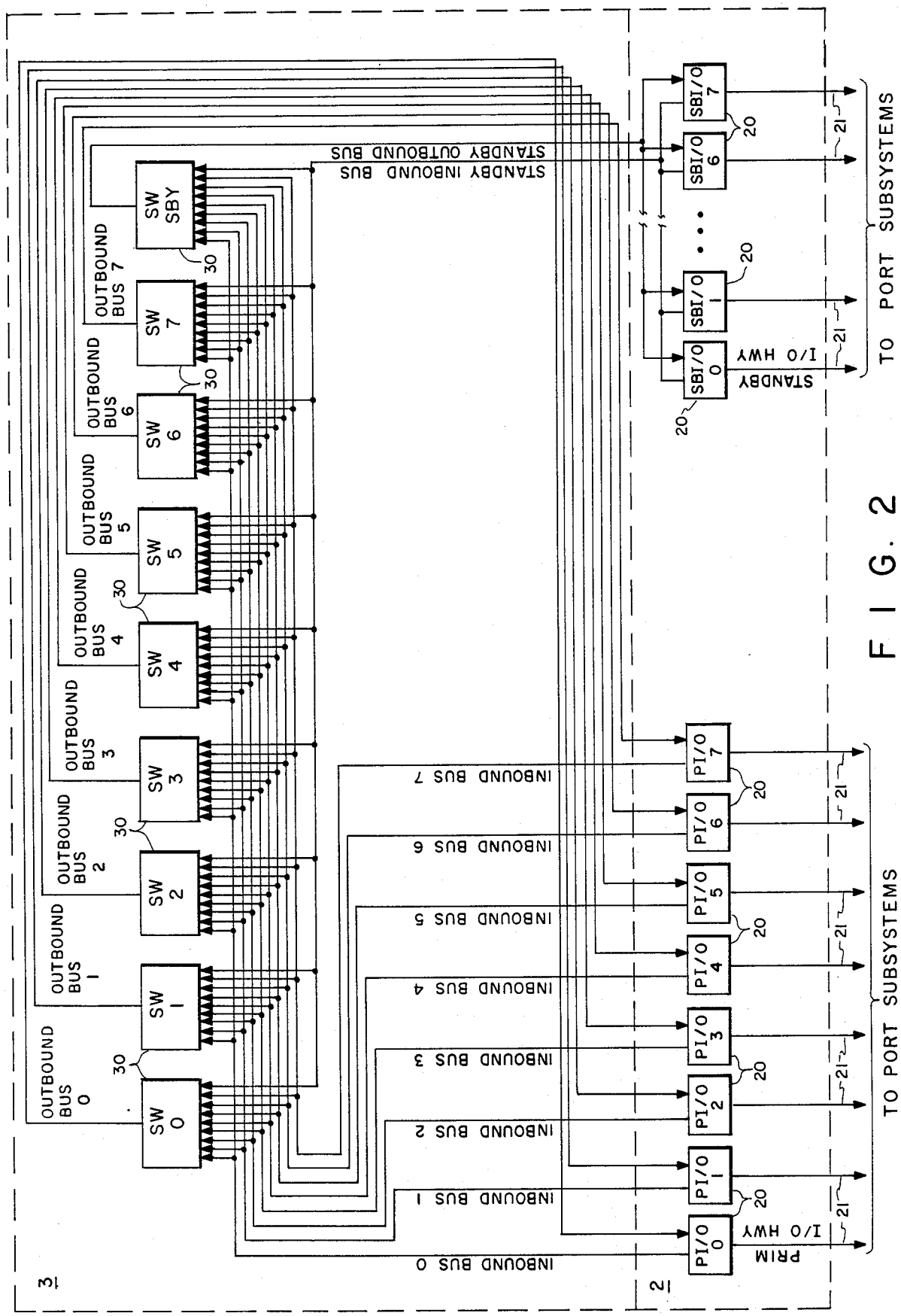
F I G. 2

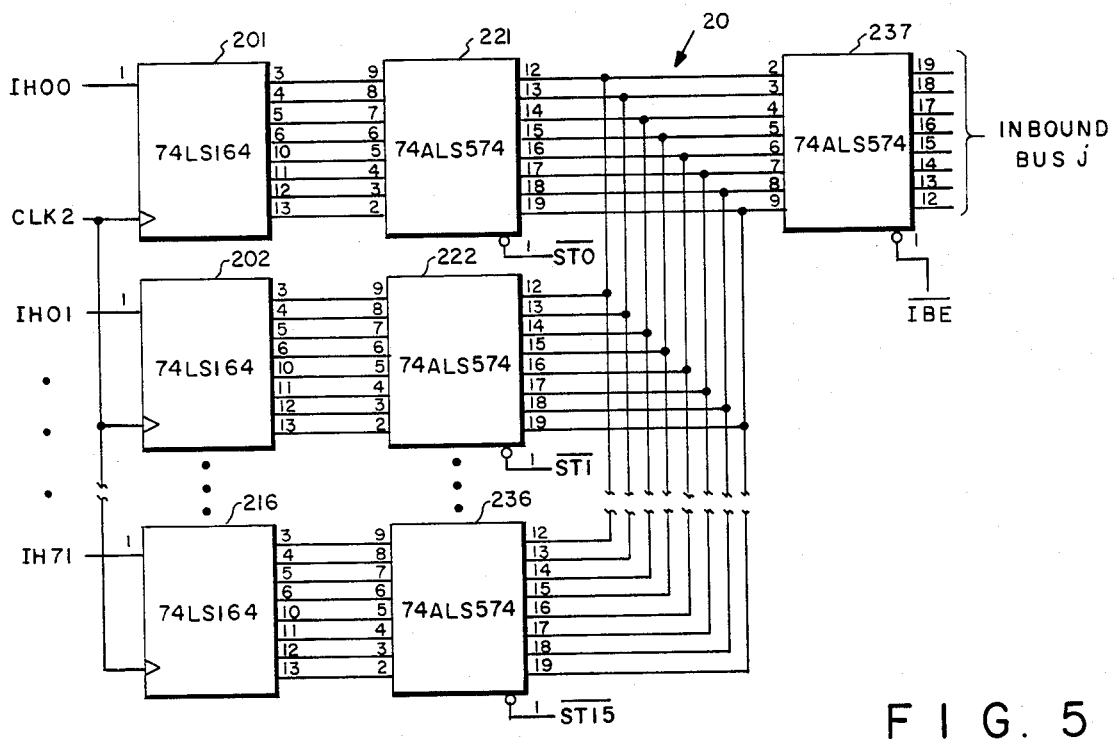
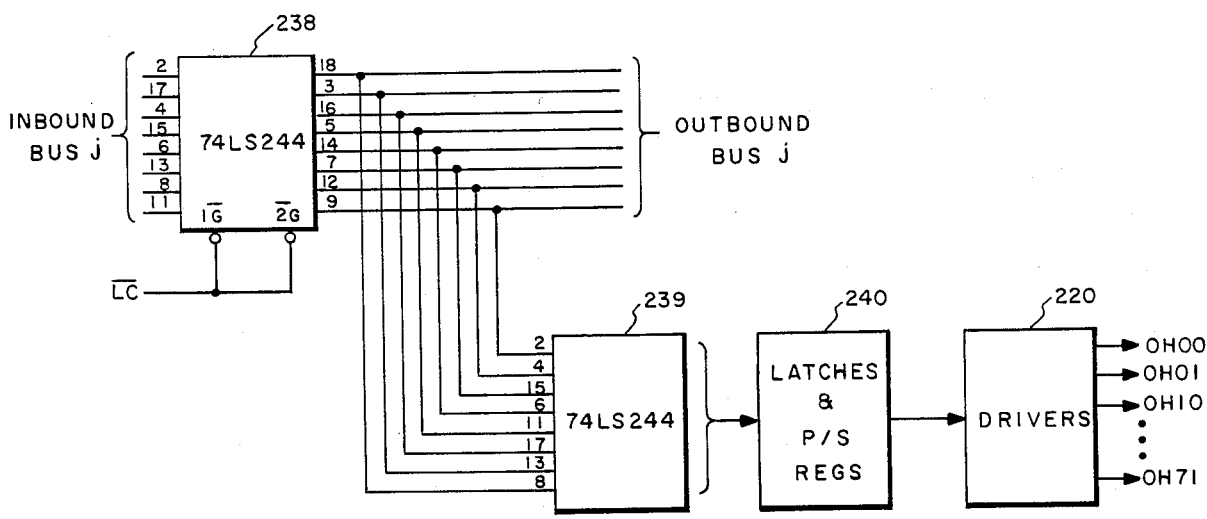
FIG. 5
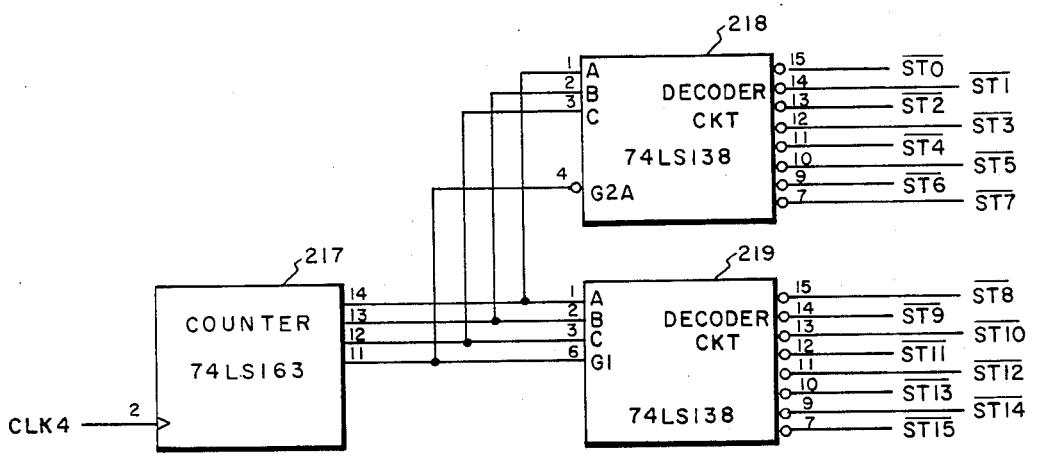

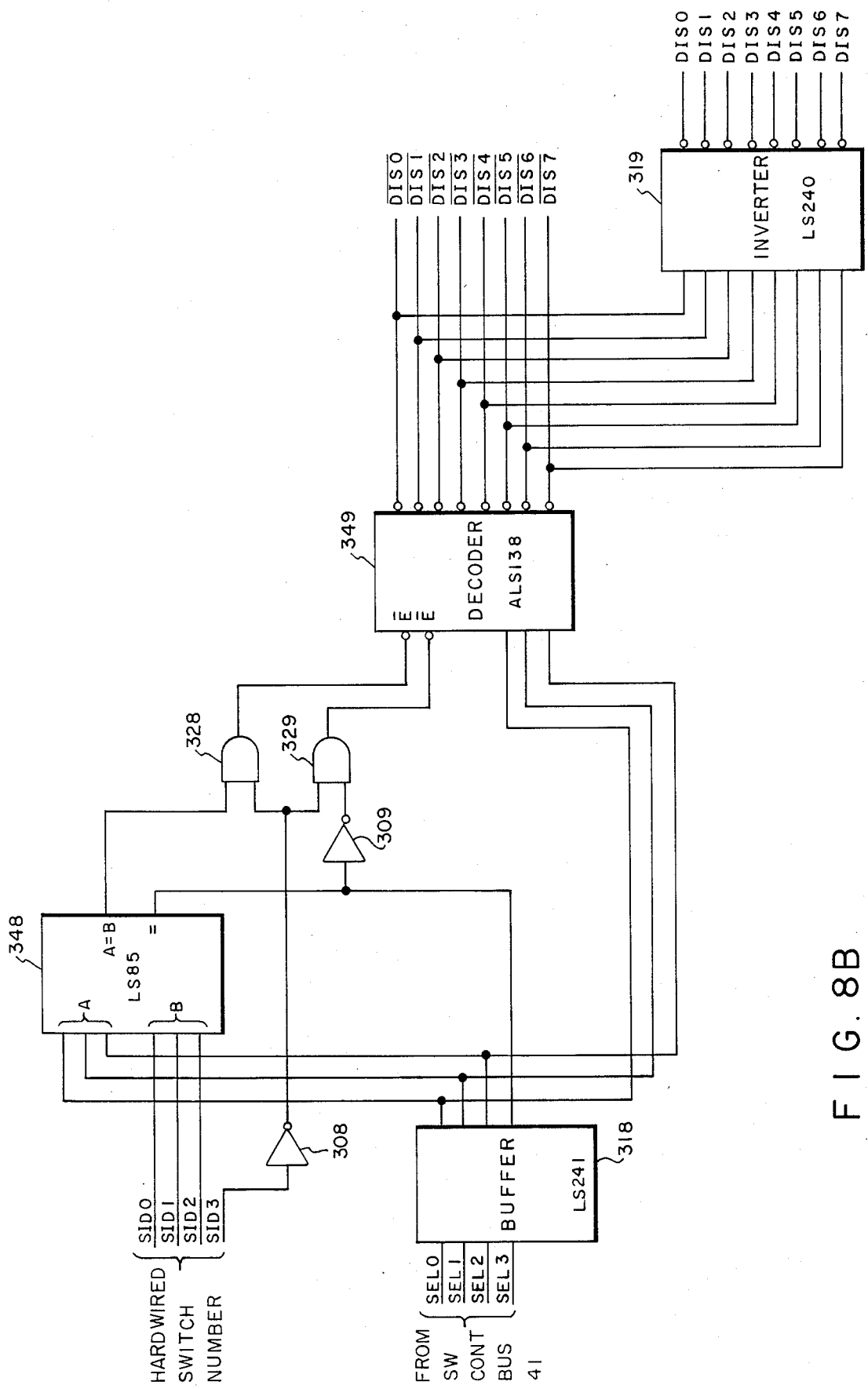
F I G. 8B

FIG. 9

ONE-FOR-N REDUNDANCY IN A DIGITAL SWITCH MATRIX

RELATED APPLICATIONS

The present application is related to U.S. patent application, Ser. No. 490,009, entitled "Apparatus for Switch Path Verification", by Larry Read, filed on even date herewith, and U.S. patent application, Ser. No. 490,007, entitled "Data Transmission System", by Larry Read, filed on even date herewith, both related applications assigned to Honeywell Inc., the assignee of the present application, and are incorporated by reference herein.

BACKGROUND OF THE INVENTION

This invention relates to a digital switching matrix of a telephone system, and more particularly, to redundancy in a digital switch matrix. Essentially all electronic systems, computer systems, telephone systems, etc., developed by man have from time to time experienced a failure or malfunction resulting in system, or partial system downtime. In order to maintain system operability, many techniques have been devised to increase the reliability and decrease system downtime. One particular scheme utilized by systems designers is the duplication of systems or subsystems, but oftentimes this approach can be economically not feasible.

Therefore, in a telephone system which includes a plurality of digital switches, there is included in the present invention a single standby digital switch, and associated enabling logic, which can be operationally substituted for any one of the plurality of digital switches thereby achieving a redundancy for all of the plurality of digital switches by a single additional switch (i.e., the standby switch).

SUMMARY OF THE INVENTION

Therefore, there is provided by the present invention a redundant digital switch matrix system comprising: a plurality of primary digital switch elements, each of the plurality of primary digital switch elements operatively coupled to a corresponding number of input buses, each of the input buses transmitting input data in predetermined time slots from a second plurality of ports associated with each of the input buses. Each of the primary digital switch elements also have an output bus for transmitting output data, each output bus being associated with one of the input buses and each output bus transmitting output data to the second plurality of ports associated therewith. A standby input bus is included, which is adapted to receive the input data from a selected one of the input buses in response to at least one select control signal, the standby bus being further operatively coupled to each of the plurality of primary digital switch elements. A standby digital switch element is operatively coupled to the corresponding number of input buses and is further operatively coupled to the standby input bus, and further has an output bus to transmit output data. Each primary digital switch element and the standby digital switch element includes a switching element for altering the switch matrix system configuration in response to at least one of the select control signals to enable the standby digital switch element to receive the input data from the input buses and the standby input bus, to effectively decouple a preselected one of the plurality of primary digital switch elements from the input buses and the standby input bus, to enable the standby input bus to receive the input data from the second plurality of ports associated with the preselected one of the primary digital switch elements, and to enable the output bus of the standby digital switch elements to transmit the output data to the plurality of ports associated with the preselected one of the primary digital switch elements, thereby effecting a substitution of the standby digital switch elements for any one of the plurality of primary digital switch elements.

Accordingly, it is an object of the present invention to provide a one-for-N redundant switch in a digital switch matrix.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 shows a functional block diagram of the preferred embodiment of a switch I/O subsystem interfacing with a switch subsystem utilized in the digital switch system of FIG. 1;

FIG. 5 shows a logic diagram of the preferred embodiment of the transfer logic of the switch I/O subsystem;

FIG. 8. which includes FIGS. 8A-8C, shows a logic diagram of the preferred embodiment of the switch subsystem;

FIG. 9 shows the contents of eight data RAMS for all eight switch subsystems for the discussed example.

DETAILED DESCRIPTION

Figure 1:
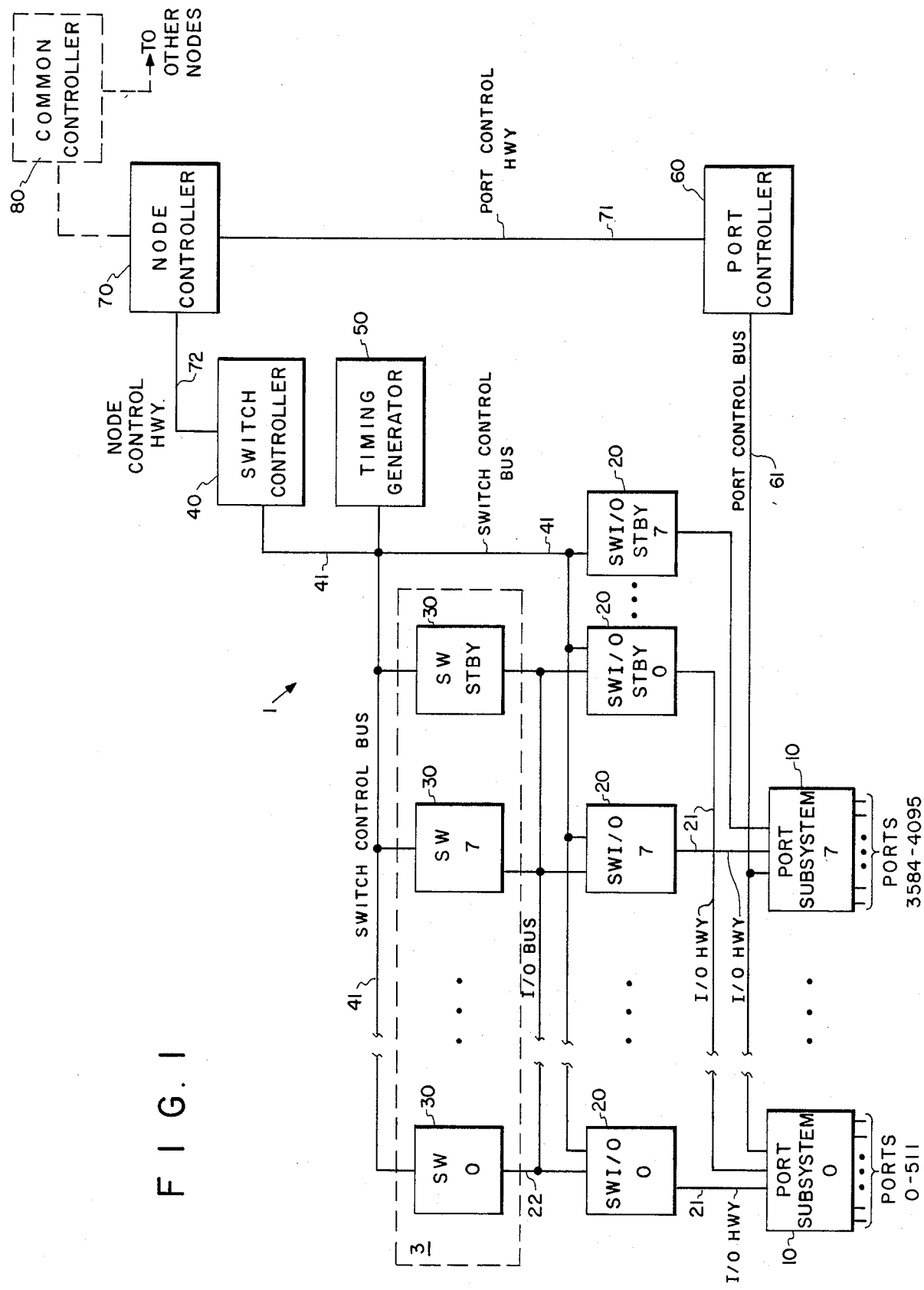
FIG. 1 shows a block diagram of a digital switch system.

Referring to FIG. 1, there is shown a block diagram of a digital switch system 1 of the preferred embodiment of the present invention. In the digital switch system 1, one of a plurality of ports is to be linked to another port for the transfer of information therebetween. Each of the plurality of ports is associated with a port subsystem 10, each port subsystem 10 having 512 ports, and further each port having a unique identifier, i.e., a number. In the preferred embodiment, eight port subsystems 10 are provided, each having 512 ports, resulting in a 4096-port digital switch system 1. Each port subsystem 10 is coupled to an associated switch I/O (SW I/O) 20 via an I/O highway (I/O HWY) 21. Further, each port subsystem 10 is coupled to a corresponding standby (STBY) switch I/O 20 via I/O highway 21. Each switch I/O 20 translates incoming serial data from I/O highway 21 into a parallel format and places the parallel data on an I/O bus 22 for transmission to a switch subsystem 3. Parallel data from the switch subsyem 3 is reformatted by the SW I/O 20 into serial data for transmission to the proper port subsystem 10, thereby completing the desired link. Switch subsystem 3 comprises a plurality of switches, the configuration of the preferred embodiment containing switch (SW) 0 through switch 7 each corresponding with a respective SW I/O 20 and also including a standby switch (SW STBY) 30. In a "normal" configuration, switch 0 through switch 7 and corresponding SW I/O 0 through SW I/O 7 are active, providing the logic to support the 4096 ports. The STBY switch 30 and associated STBY SW I/O 20 (there is a standby switch I/O corresponding to each primary switch I/O) can be made to replace any of the switches 0 through 7 in the event of an error or for verification of the link (also referred to herein as path or data path). The substitution of the STBY SW I/O 30 and associated STBY SW I/O 20 for any of the switches 0 through 7 (and corresponding SW I/O 0 through 7) is controlled by a switch controller 40 coupled to each SW 30 and each SW I/O 20 via a switch control bus 41. Timing and clocking signals (CLK and SYN) are provided by a timing generator 50 which is operatively coupled to the switch control bus 41. A hierarchial control architecture is implemented in the preferred embodiment of the digital switch system 1. A port controller 60 interfaces with the port subsystems 10 via a port control bus 61 which provides control of the ports and reports status information to node controller 70, the node controller 70 being operatively coupled to port controller 60 via a port control highway 71. A single port controller of the preferred embodiment controls 64 ports, referenced herein as a port subsystem. The node controller 70 maintains the status of the port controllers and provides the overall control of the node, which includes providing control information to switch controller 40 via node control highway 72. The highest level of control in the digital switch system 1 hierarchy resides in a common controller 80 which interfaces with node controller 70. The common controller 80 can also include interfacing to other nodes. System status information is passed between the various controllers of the system, thereby allowing each controller to coordinate its control function in the overall system operation. Switch controller 40 and port controller 60 are implemented in the preferred embodiment utilizing an Intel 8088 microprocessor, and the node controller 70 is implemented in the preferred embodiment utilizing an Intel 8086 microprocessor. The common controller 80 of the preferred embodiment is implemented utilizing a Data General NOVA IV minicomputer. Each of the subsystems mentioned above will be discussed further hereinunder. Although the preferred embodiment of the digital switch system 1 is implemented via the groupings discussed above, for example, eight port subsystems 10 with each port subsystem 10 having 512 ports, it is to be understood by one skilled in the art that different groupings can be made without departing from the true spirit and scope of the present invention. Further, the control architecture can be implement utilizing many alternative configurations, including a variety of combinations of distributed control hierarchy, including a variety of different microprocessors or minicomputers, without departing from the true spirit and scope of the present invention.

Referring to FIG. 2, there is shown a functional block diagram of the preferred embodiment of switch subsystem 3 and switch I/O subsystem 2. Switch I/O subsystem 2 comprises a plurality of switch I/Os 20, namely SWIO 0̸-SWIO 7 (also denoted) herein as primary I/O, PIO), and a plurality of standby switch I/Os, namely SBIO 0̸-SBIO 7. Each PIO 20 and each SBIO 20 is operatively connected to a corresponding port subsystem 10 via primary I/O highway (PRIM I/O HWY 21) and standby I/O highway (STANDBY I/O HWY) 21, respectively. As mentioned above, switch subsystem 3 comprises a plurality of switches 30, namely SW0̸-SW7, and standby switch SWSBY. Each PIO 20 has an inbound bus which is operatively connected to each switch 30. Each switch 30 has an outbound bus operatively connected to a corresponding PIO 20. Each standby SBIO 20 is coupled to a standby inbound bus which is coupled to each switch 30. Likewise, the output of standby switch SWSBY 30 is coupled to each standby switch I/O, SB I/O, via a standby outbound bus.

Figure 3:
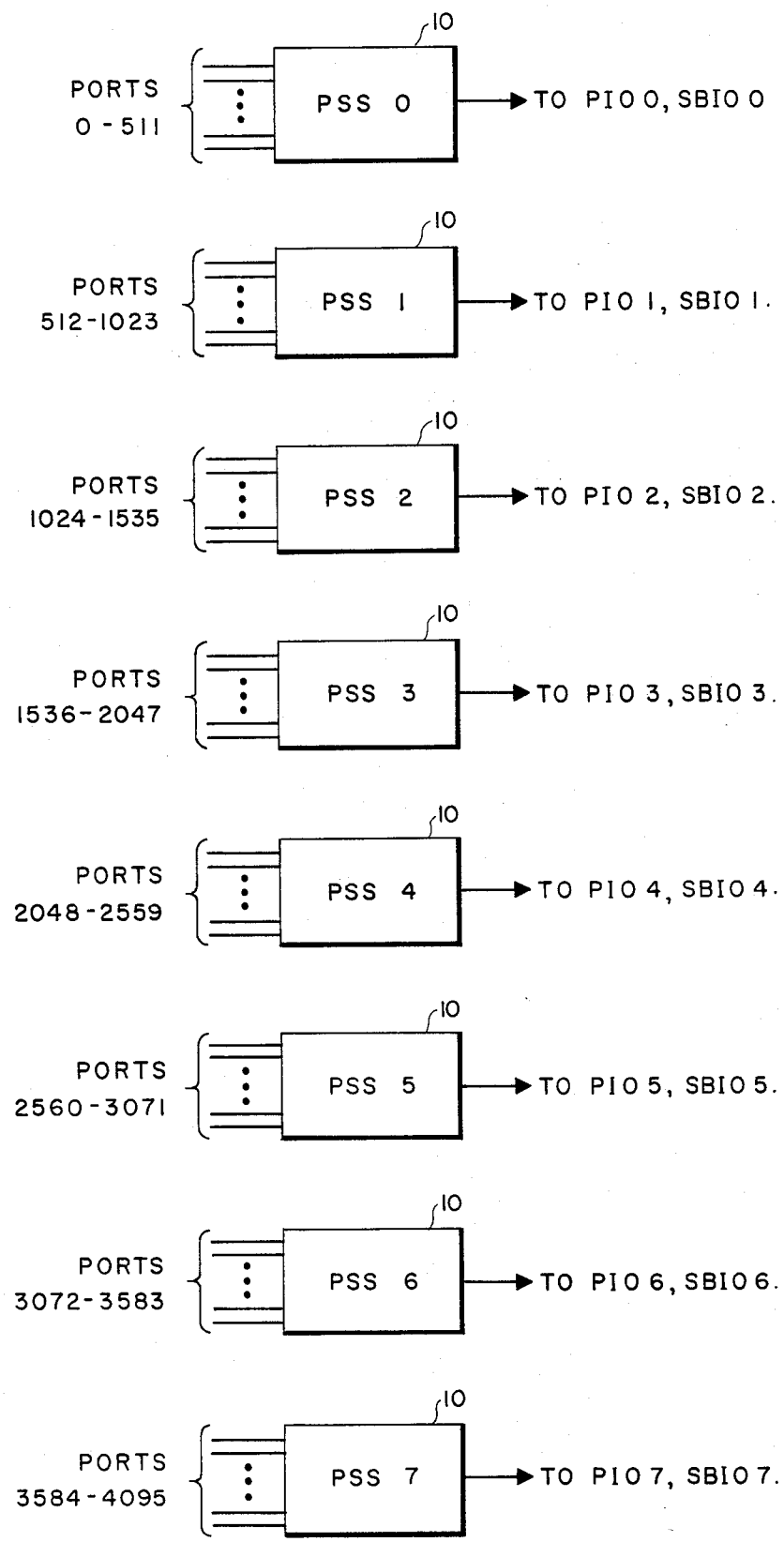
FIG. 3 shows a block diagram of a port subsystem.

Referring to FIG. 3, there is shown a block diagram of the port subsystem. The port subsystem of the preferred embodiment comprises port subsystem 0̸ through port subsystem 7 (PSS0̸-PSS7). Each port subsystem 10 has associated therewith 512 ports, PSS0̸ having ports 0̸ through 511, ... and PSS7 having ports 3584 through 4095. Each port subsystem 10 interfaces with a corresponding primary switch I/O, PIO, and a corresponding standby switch, I/O SBIO. Thus, PSS0̸ interfaces with PIO0̸ and SBIO0̸, PSS1 interfaces with PIO1 and SBIO1,..., and PSS7 interfaces with PIO7 and SBIO7.

Figure 4:
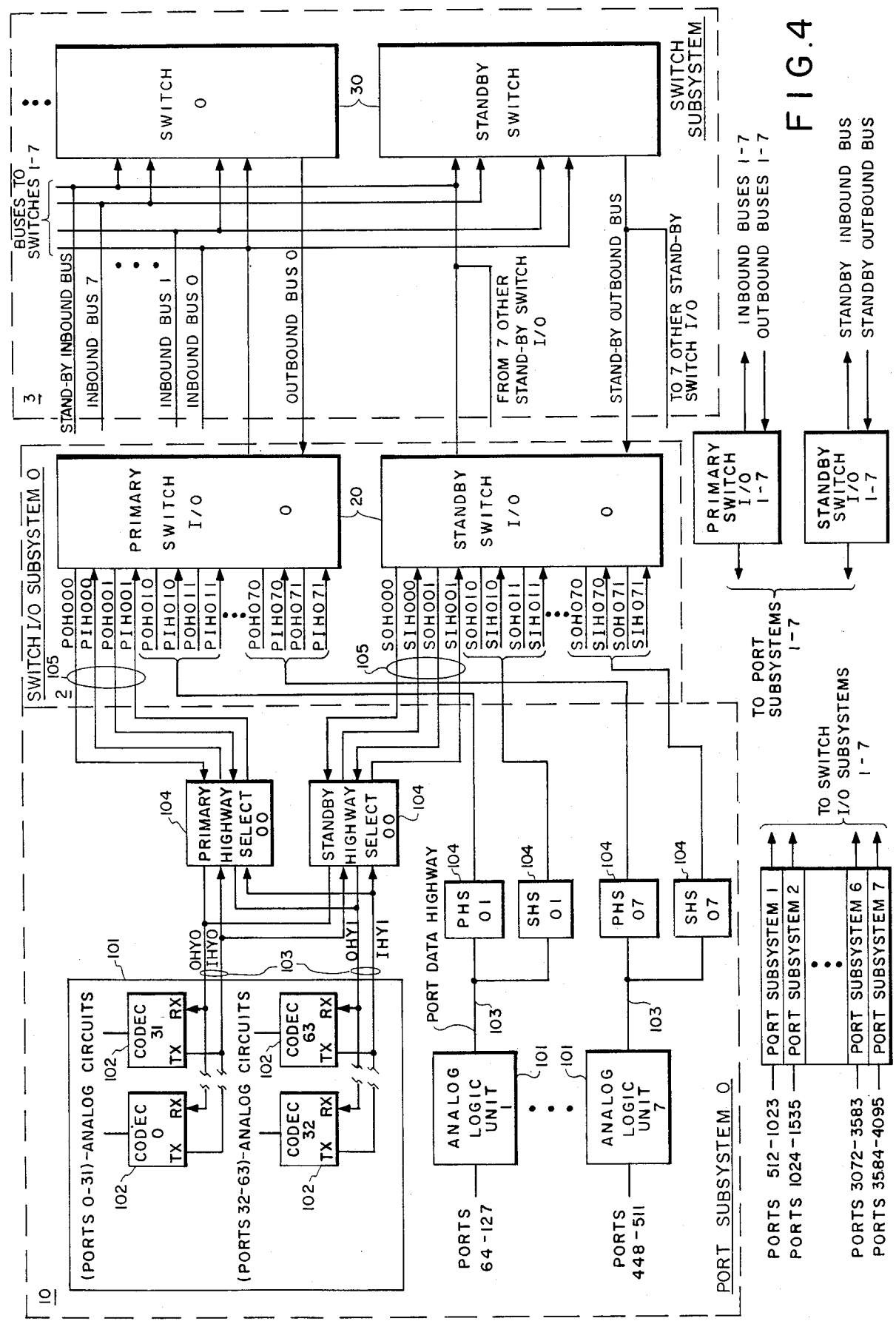
FIG. 4 shows a functional block diagram of the preferred embodiment of the port subsystem utilized in the digital switch system of FIG. 1.

Referring to FIG. 4 there is shown a functional block diagram of a port subsystem. Port subsystem 0̸ 10 interfaces with switch I/O subsystem 0̸ 2', which comprises primary switch I/O 0̸ and standby switch I/O 0̸. Port subsystem 0 includes eight analog logic units 101 which are each capable of supporting 64 ports. Ports 0̸-31 each accept an analog signal via an analog circuit (not shown) which is coupled to a corresponding CODEC 102. The input (TX) and the output (RX) of the 32 CODECS 102 for ports 0̸-31 are coupled to form an input highway 0̸, IHY0̸, and output highway 0̸, OHY0̸, respectively. Likewise CODECS 102 are provided for ports 32 through 63, the output of the second grouping of CODECS forming input highway 1, IHY1, and output highway 1, OHY1. IHY0̸, IHY1, OHY0̸, and OHY1 form port data highway 103 which is coupled to a primary highway select (PHS) 104 and a standby highway select (SHS) 104. Analog logic unit 101 which includes ports 0̸-63 is designated as analog logic unit 0, analog logic unit 101 which includes port 64-127 is designated as analog logic unit 1, ... and analog logic unit 101 which includes ports 448-511 is designated as analog logic unit 7. Each analog logic unit 101 has associated therewith a corresponding PHS 104 and SHS 104, which is designated as PHSXY and SHSXY, where X is the port subsystem number and Y is the analog logic unit number. (Likewise, port subsystem 1 10 has eight analog logic units 101, 0-7, corresponding to ports 512-575, 576-639, ... and 960-1023, with an associated PHS 10-PHS 17, and SHS 10-SHS 17, respectively.) The analog circuitry (not shown) of analog logic unit 101 can include circuitry for handling voice signals associated with telephone communications which is well known by those skilled in the art and will not be discussed further. The CODECS 102 of the preferred embodiment utilizes a Motorola MCXXXX.

Primary switch I/O 0̸ and standby switch I/O 0̸ interface with port subsystem 0̸. PI/O 0̸ interfaces with PHS0̸-PHS7, and SBIO 0̸ interfaces with SHS 0̸ and SHS 7, via I/O data highway 21, more specifically denoted here as switch data highway 105. The interface of PI/O 0̸ includes POH 000, PIH 000, POH 001, PIH 001, . . . and PIH 071. (The switch data highway 105 is designated PIH, POH, SIH and SOH XYZ, where P is the primary switch I/O and S is the standby switch I/O, IH or OH is the input highway or output highway, X designates the port subsystem number, Y indicates the analog logic unit number within the port subsystem, and Z designates the 0 or 1 port data highway number 103.) The SBIO interface includes the corresponding lines from the eight SHS 104.

In the preferred embodiment of the present invention, one Primary I/O 20 and one Standby I/O 20 is provided for each group of 512 ports. The Primary I/Os are coupled to their associated Primary Highway Select Unit 104 and the Standby I/Os are coupled to their associated Standby Highway Select Unit 104. Each Primary I/O 20 has a dedicated Inbound Bus and a dedicated Outbound Bus through which data is transmitted to the associated Switch 30 and received from the associated Switch 30, respectively. All of the Standby I/Os 20 are coupled to a common inbound bus and a common outbound bus, denoted herein as the Standby Inbound Bus and the Standby Outbound Bus, respectively.

The Standby I/O 20, selected by Select Control Signals, is enabled onto the Standby Inbound Bus. The Inbound Bus drivers of all the other Standby I/Os are in the high impedance state, thereby effectively decoupling these Standby I/Os from the Standby Inbound Bus. All of the Standby I/Os receive data from the Standby Outbound Bus and pass the data to the Outbound Switch Data Highways independent of the condition of the Select control signals. However, the drivers of the associated highway select units not selected by the select control signals are disabled, effectively decoupling the unselected standby I/Os 20 from the Standby Outbound Bus. This selection process will be described further hereinunder.

Referring to FIG. 5, the switch I/O 20 will now be discussed. As mentioned above the SWIO 20 translates serial data from the port subsystem 10 into an eight bit parallel format and transmits the parallel data to the associated switch 30 via the inbound bus. The SWIO 20 also receives data from the switch 30 via the outbound bus and reformats the parallel data to a serial data format for transmission to its corresponding port subsystem 10. As discussed above, in conjunction with FIG. 4, the SWIO 20 of the preferred embodiment has 16 input lines coupled from its corresponding port subsystem 10, the input lines being designated IH00 through IH71. Each input line is coupled to a respective eight bit serial-parallel register 201-216, the eight bit parallel data being transferred to a corresponding eight bit register 221-236. Each eight-bit register 221-236 is sequentially strobed by a corresponding strobe signal $\overline{ST\emptyset}-\overline{ST15}$ such that each eight-bit register 221-236 is strobed once during a sub-frame. The data from each eight bit register 221-236 is thereby coupled in turn to a holding register 237 which outputs the data onto the inbound bus. (Note: j is the SWIO 20 number, thus for SWIO 0, J=0, etc.) The holding register 237 is enabled by an enable signal $\overline{IBE}$, which will be discussed further hereinunder.

Figure 6:
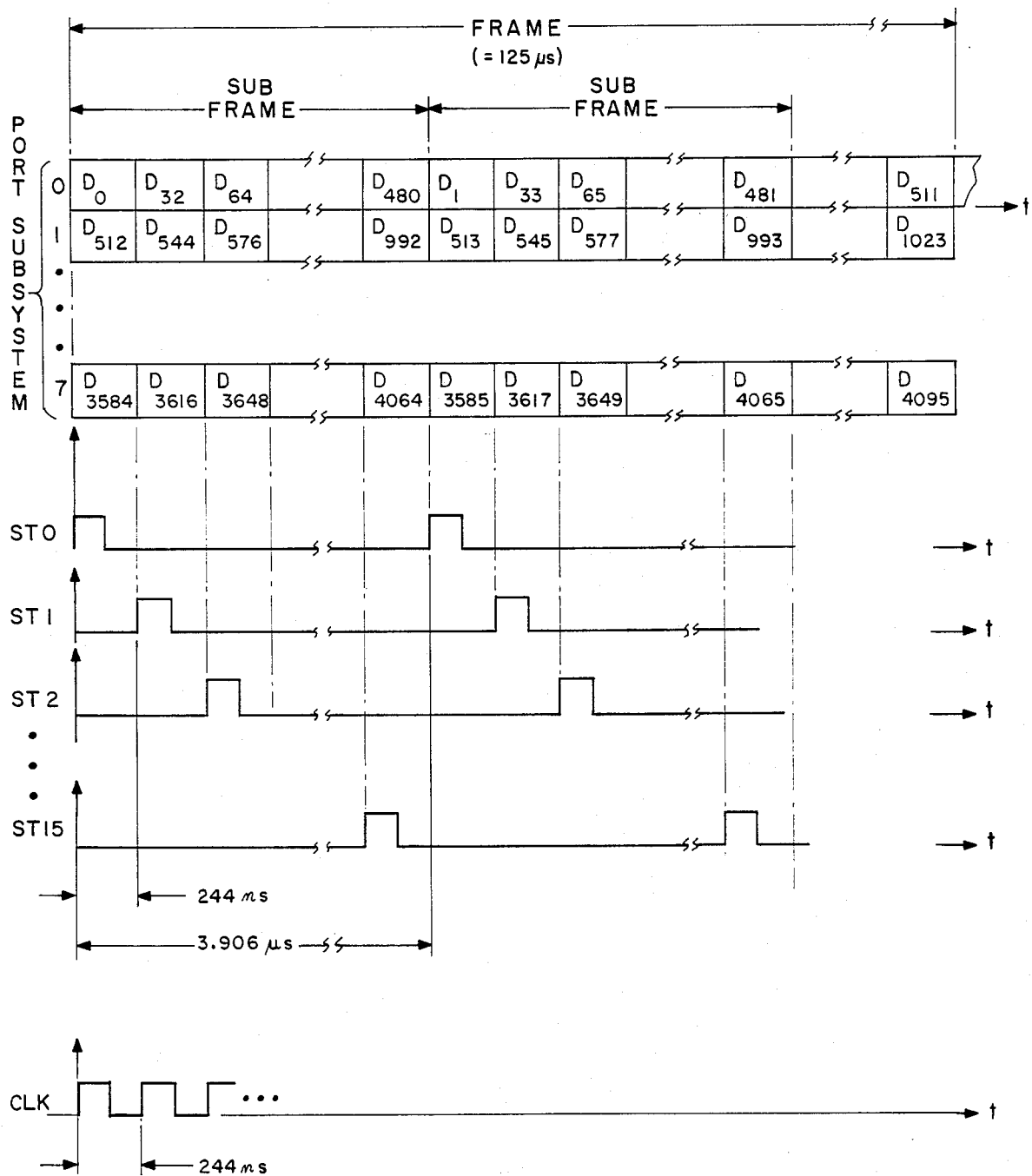
FIG. 6 shows a timing diagram of the data read from ports of the port subsystem and some timing signals.

The strobe signals $\overline{ST\emptyset}-\overline{ST15}$ are generated by a counter 217 and decoder circuit 218, 219. CLK4 of the preferred embodiment which drives counter 217 is a 4.096 MHZ is supplied from the timing generator 50. Referring to FIG. 6, there is shown the timing diagram of the strobe signals ST0-ST15. As mentioned above each eight bit register 221-236 is strobed once during a sub-frame, a sub-frame of the preferred embodiment being 3.906 microseconds, and the serial input bit rate from each of the 16 input lines is 2.048 MHZ. Thus, the first strobe ST$\emptyset$ reads the data from port $\emptyset$, the next strobe ST1 reads the data from port 32 which is from input line IH01, the next strobe ST2 reads the data from port 64 which is from input line IH10, . . . until the last strobe of the sub-frame ST15, which reads the data from input line IH71 which corresponds to the data from port 480. The next sub-frame reads the data from the next sequential port from each input line, thus the data being read is the data from port 1, then the data from port 33, then the data from port 65 . . . until the end of the sub-frame which reads the data from port 481. It can be seen then, that 32 sub-frames, which makes up one frame, is required to read the data from all 512 ports associated with a port subsystem. (The foregoing has been the data read from port subsystem 0. In parallel with the above read operation, port subsystem 1 through port subsystem 7 have each been reading the data from the respective ports in a like fashion.) The clock signal CLK (or CLK4) of the digital switch system 1 is shown.

Referring back to FIG. 5, the data from holding register 237 is also coupled to a loop register 238, which is enabled by a loop control signal ($\overline{LC}$). In normal operation $\overline{LC}$ is such that the loop register 238 is disabled. However, in a verification mode the loop register 238 can be enabled such that the inbound data is looped back to the outbound bus without the data being transmitted to the corresponding switch 30.

Outbound bus data from the corresponding switch 30 is coupled via the outbound bus j to the corresponding SWIO 20 and coupled into a buffer 239. A plurality of latches and parallel to serial registers 240 is provided which performs the inverse operation of that discussed above. The serial data is then coupled to a plurality of drivers 220 for output on the respective output lines OH00 through OH71.

Figure 7:
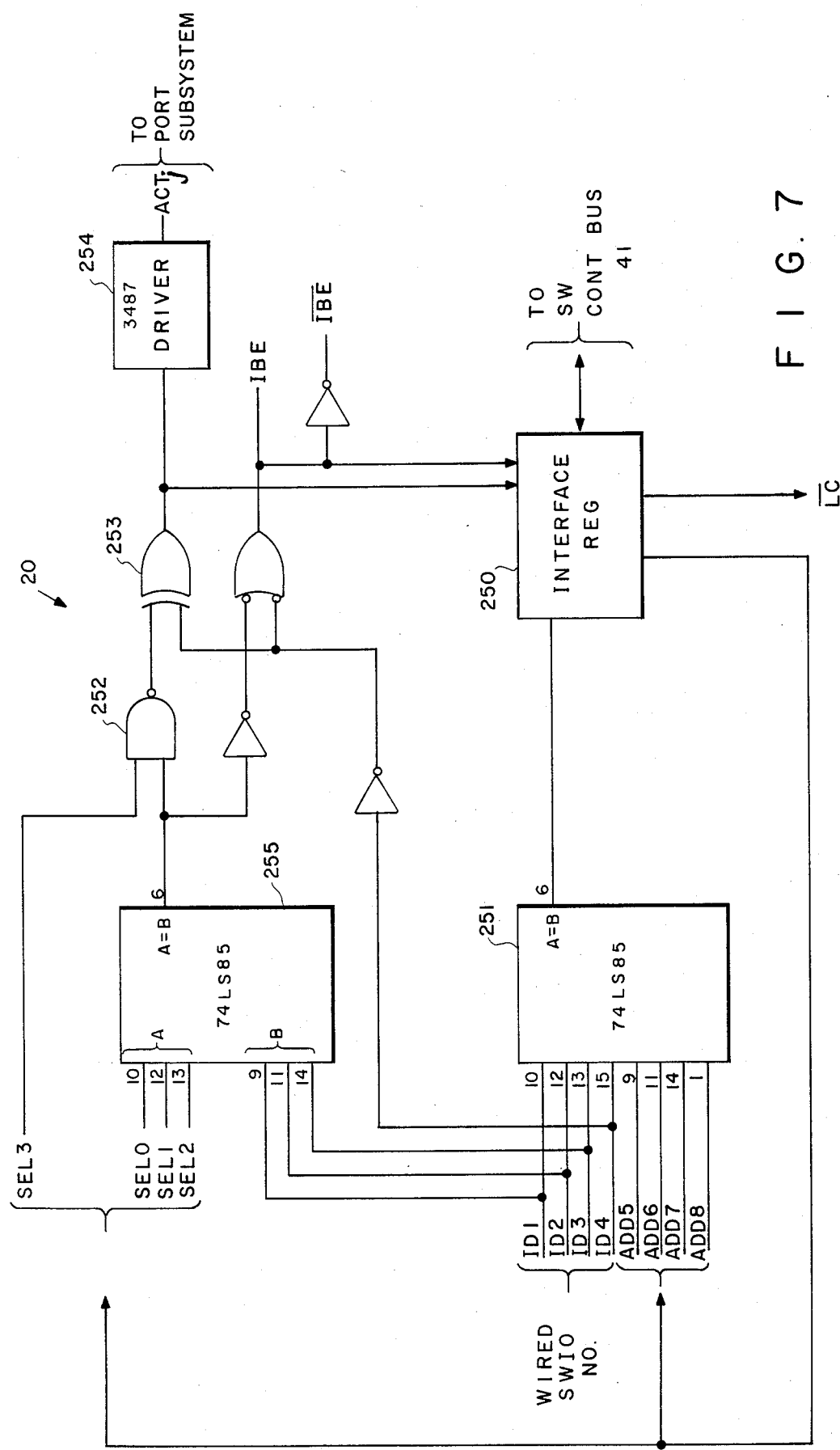
FIG. 7 shows a logic diagram of the control logic of the preferred embodiment of the switch I/O subsystem.

Referring to FIG. 7, the control logic of the SWIO 20 is shown. An interface register 250, which is coupled to the switch control bus 41, provides status information to the switch controller 40 and also provides a means for permitting the switch controller 40 to transmit status and command information to the SWIO 20. Each SWIO 20 can be accessed individually by the switch controller 40 via address line ADD5-ADD8 of the switch control bus 41. These address lines are coupled to the first set of inputs of a comparator 251. The second set of inputs of comparator 251 are coupled to signals ID1-ID4 which are hard wired signals for each SWIO 20. The ID1-ID4 signals for each SWIO are unique thereby providing a means for identifying PIO $\emptyset$-7 and SBIO $\emptyset$-7. When the first and second set of inputs to comparator 251 are equal, the interface register 251 is enabled thereby permitting the switch controller 40 access to the interface register 250.

In the preferred embodiment the SWIOs designated as standby SWIOs have ID4 set to a logic 0, and ID 1-3 indicate the number 0-7 corresponding to SWIO $\emptyset$-7. Likewise ID 4 is set to a logic 1 for all the SWIOs 20 designated as PIOs and ID 1-3 indicate the number $\emptyset$-7. Normally, all the standby logic of digital switching system 1 is inactive. In a standby configuration, the SBY SW 30 is substituted for a single primary switch SWj 30, the operation of SW 30 to be discussed further hereinunder. Also, in a standby configuration, the SWIOj is substituted for the PIOj. The standby configuration is controlled from the switch controller 40 by four signal lines SEL0–SEL3 via the switch control bus 41. The four signal lines, SEL0–SEL3, are static signal lines driven by a latch (not shown) from the switch controller 40. In a normal configuration, SEL3 is a logic 0. Hence, the first input to exclusive OR gate (X-OR) 253 is a logic 1. The second input to X-OR gate 253 will be a logic 0 for all the primary I/Os, since ID4 is a logic 1. Hence, the output of X-OR gate 253 is a logic 1 activating the driver network 254 and providing an active signal to its associated port subsystem via the ACTj signals. The ACT signal will be discussed further hereinunder. Since all the standby switch I/Os have ID4 equal to a logic 0, the second input to X-OR gate 253 is a logic 1, and since both inputs to X-OR gate 253 are logic ones, the output is a logic 0 thereby disabling the respective driver networks 254 for all the standby switch I/Os. The inbound bus enable signal (IBE and IBE, which is coupled to holding register 237) is such that the holding register 237 for all the primary I/Os will be enabled.

When SEL3 is set to a logic 1 the standby configuration is designated. The SWIOj specified by the switch controller 40 via the SEL0–SEL2 signals, will result in a compare equal output from a comparator 255, that is, one primary and one standby switch I/O will have an output from the comparator 255. For the specified primary SWIO, the first input to X-OR gate 253 will be a logic 0 since both inputs to NAND gate 252 are a logic 1, and the second input to X-OR gate 253 remains at a logic 0, thereby resulting in a logic 0 output and removing the active signals to the primary highway select j of the corresponding port subsystem. Likewise, for the specified standby SWIO, the first input to X-OR gate 253 will be a logic 0, and the second input to X-OR gate 253 remain at a logic 1. In the case, the X-OR gate 253 is enabled thereby providing the enable signal to its driver 254 providing the active signals to the standby highway select logic of the specified port subsystem.

The active signal and the inbound bus enable signal are coupled to the interface register 250 for providing status information to switch controller 40. The switch controller can command the loop-around capability by providing the loop control signal (LC) to the interface register 250 which is coupled to the loop register 238.

Primary Switch I/Os 20 receive inbound data from the associated Inbound Switch Data Highways 105 and transmit inbound data on the corresponding Inbound Buses continuously, independent of the condition of the select control signals. The Standby I/Os 20 receive data from the Inbound Switch Data Highways independent of the select control signals (SEL0–SEL3), but only the Standby I/O selected by bits SEL2–SEL0 transmit on the Standby Inbound Bus. The transmission on the Standby Inbound Bus by the selected Standby I/O occurs independent of the condition of SEL3. The Inbound Bus Drivers for Standby I/Os which are not selected are in the high impedance state. The changeover to or from a standby configuration is accomplished by the Switches 30. Changeover for inbound data is accomplished by the switches 30. Changeover for outbound data is accomplished by the highway select units 104 via the ACT signal from the switch I/O 20, as discussed above. The Switches 30 decode the static signal lines, SEL0–SEL3, (also referred to herein as the Static Select Bus) and receive data from the specified Inbound Bus for the indicated configuration.

Figure 8A:
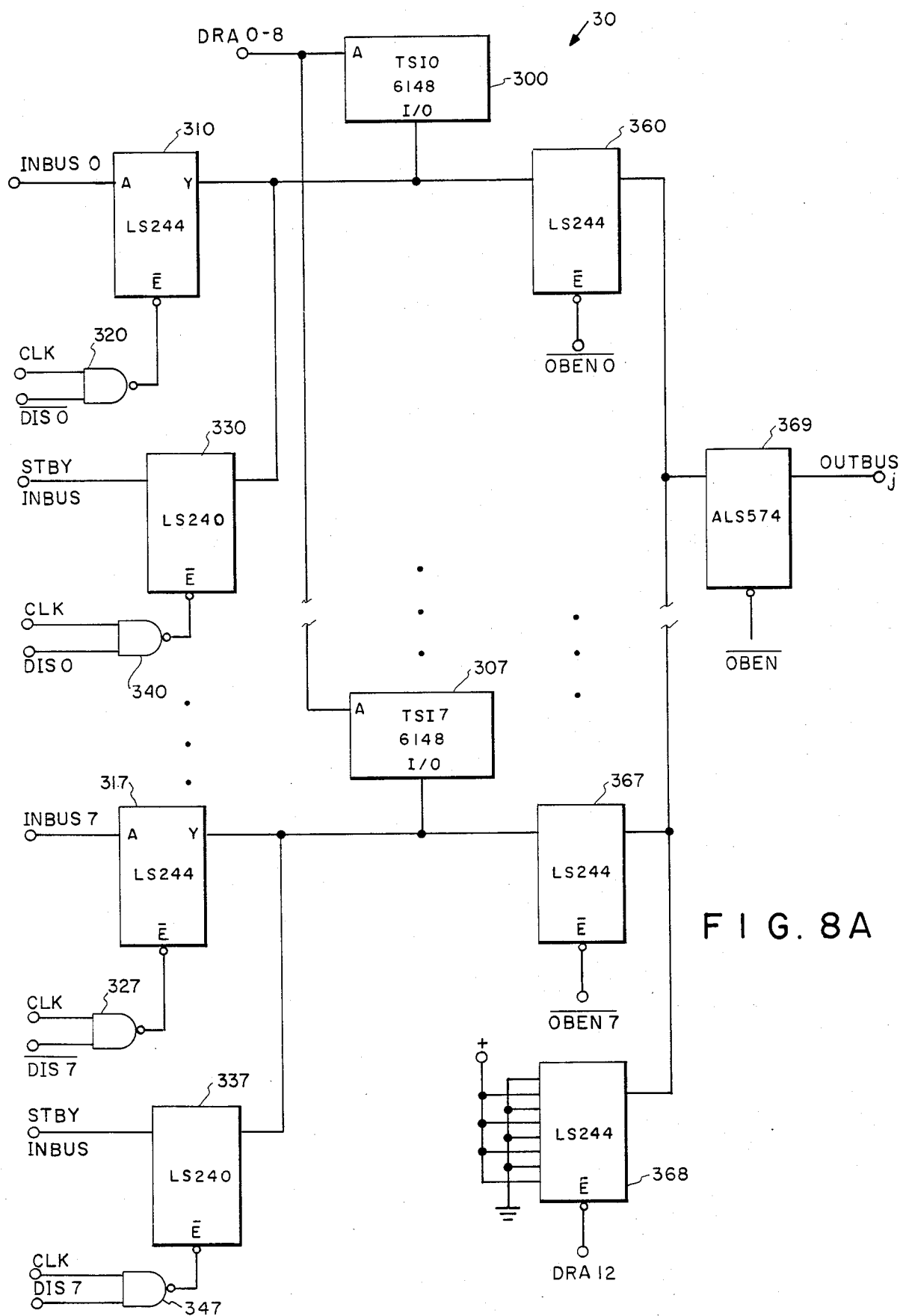

Referring to FIG. 8A, there is shown a partial logic diagram of the switch 30. Each switch 30, SW0–SW7 and SWSBY, includes eight data RAMS (TSI0–TSI7) 300–307, wherein each data RAM of the preferred embodiment is a 6148 IC, 512×8 RAM. The data to be inputted to each data RAM 300–307 is coupled from the corresponding INBOUND bus (INBUS), i.e., TSI0 300 is operatively coupled to INBUS 0, TSI1 301 is operatively coupled to INBUS 1, ... and TSI7 307 is operatively coupled to INBUS 7. The data from each INBUS line is coupled through a corresponding buffer 310–317 which is enabled via an associated enable signal DIS0–DIS7, coupled through NAND gate 320–327, respectively. In addition, each data RAM is operatively coupled to the standby bus (STBY INBUS) through a second buffer 330–337 which is enabled by as associated DIS0–DIS7 signal coupled through NAND gate 340–347. In a normal configuration, enable signals DIS0 through DIS7 are at a logic one which operates to operatively connect each TSI 300–307 to its corresponding INBUS. Conversely, DIS0 through DIS7 are at a logic zero disabling each second buffer 330–337, thereby decoupling the STBY INBUS from any of the data RAMS 300–307.

Referring to FIG. 8B, there is shown control logic of each switch 30 for controlling the configuration of the switch 30 in response to the control signals SEL-0–SEL3. Each switch 30 interfaces with the switch control bus (SW CONT BUS) 41 for receiving the SEL0–SEL3 signals through a buffer 318. In a normal configuration, SEL3 is a logic 0, which disables comparator 348 and decoder 349 for each primary switch S0–S7, resulting in the DIS0–DIS7 signals output from an inverter 319 to be in a logic 0 state and the DIS0–DIS7 signals output from decoder 349 to be in a logic one state, thereby coupling each TSI 0–7 300–307 to its respective INBUS for each primary switch, SW0 through SW7. Each switch is identified by an ID number which is hardwired for each switch 30, number being contained in a signal SID0–SID3 for each switch. SID0–SID2 identify primary switch 0–7 where SID3 is a logic 0. The standby switch has SID3 equal to a logic 1. Therefore, for the standby switch 30, since the output of inverter 308 is a logic 0, the output of AND gate 328 is a logic 0 and the output of AND gate 329 is a logic 0, enabling decoder 349 which results in the DISx (where x can be from 0–7 as determined by SEL0–2) being at a logic 0 which decouples the standby switch from the primary inbound buses 0–7.

When SEL3 equals a logic 1, the standby mode (or configuration) is selected. When SEL3 equals a logic 1, the output of inverter 309 is a logic 0 resulting in a logic 0 output from AND gate 329. Assuming for purposes of example and in no way intended to limit the present invention, that the SEL0–2 signals correspond to a value of 7, the output of comparator 348 will be a logic 0 for all the comparators of switches 0–6, enabling decoder 349. Hence, the output of decoder 349 for switches 0–6 will result in DIS7 being at a logic 0 and DIS0–6 will be at a logic 1. Thus switches 0–6 will have TSI0–TSI6 300–306 coupled to the respective inbuses 0–6. Since DIS7 is at a logic 0, and DIS7 is at a logic 1, buffer 317 for each switch 0–6 will be disabled and second buffer 337 for each switch 0–6 will be enabled resulting in SW0–6 being coupled to the standby bus and decoupled from inbus 7. In this example, the output of comparator 348 for switch 7 will be at a logic 1, and a logic 1 output from AND gate 328, thereby disabling decoder 349. With decoder 349 disabled, the outputs $\overline{DIS0}$-$\overline{DIS7}$ are at a logic one.

The output of comparator 348 for the standby switch is a logic 0, thereby enabling its decoder 349, resulting in $\overline{DIS0}$-$\overline{DIS6}$ being at a logic 1 and DIS7 being at a logic 0. Thus, the standby switch is effectively coupled to INBUS 0 through INBUS 6 and STBY INBUS. Hence, it can be seen that this example, the standby bus and the standby switch have been substituted for inbus 7 and switch 7 respectively. In a like fashion, the standby bus and the standby switch can be made to substitute for any one of the inbuses and corresponding primary switches as commanded by the select signals SEL0-SEL3.

Figure 8C:
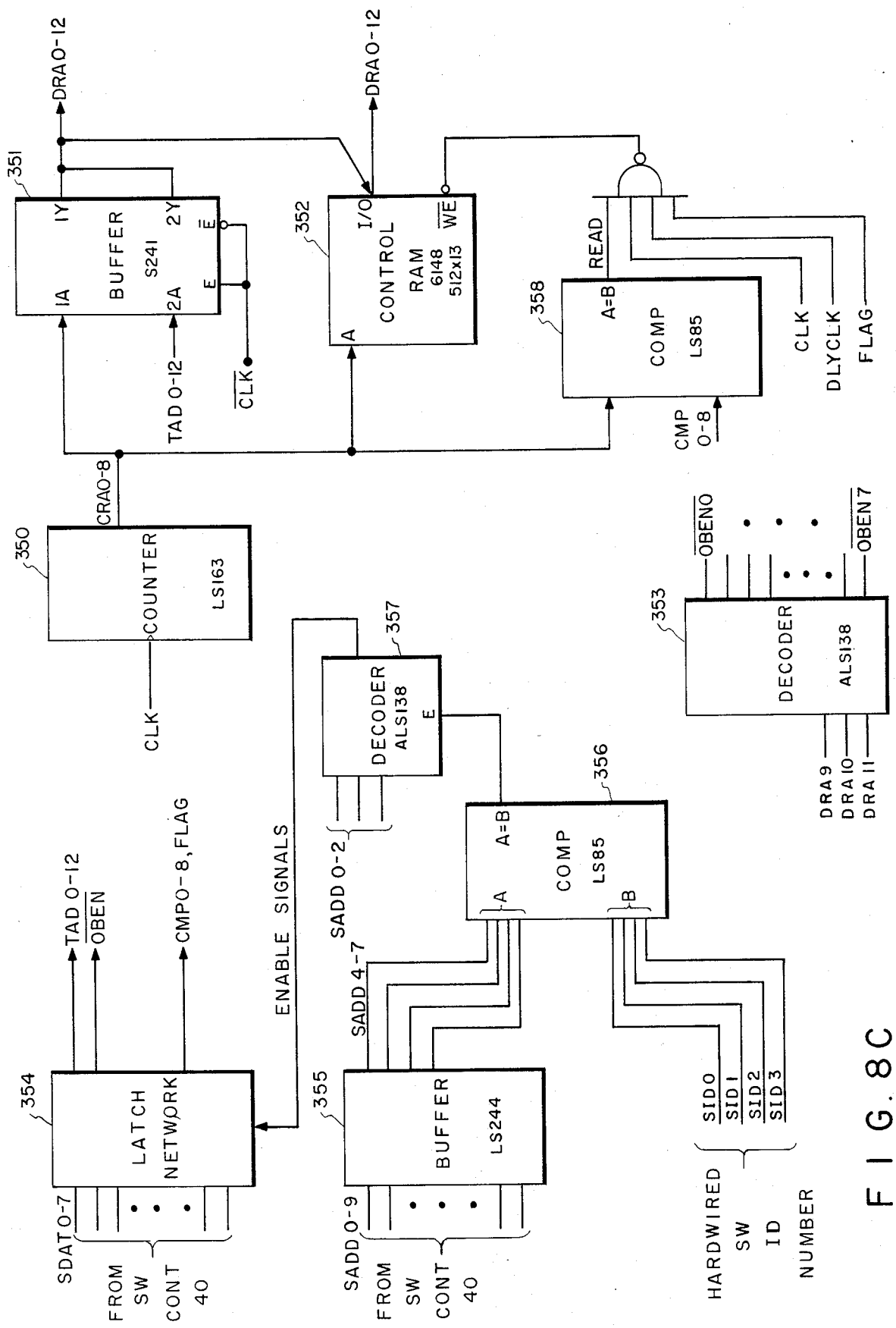

As discussed above, each switch 30 has an interface to the eight primary inbound buses and has one outbound bus. Each switch 30 contains eight TSIs (time slot interchanges) 300-307, each TSI of the preferred embodiment of the present invention being an 8×512 bit RAM, allowing each switch 30 to accept data from any of the 4,096 ports. Referring to FIG. 8C, the read-/write control logic of the TSIs is shown. Inbound data is received from the switch I/O subsystem 2 in parallel format. Each inbound bus contains data in 512 time slots as discussed above in conjunction with FIG. 6, each time slot containing eight bits of parallel data from a port. The data in each time slot is written into the respective TSI during the positive half of the CLK signal of each time slot. The TSI write address, which is the same for all eight TSIs 300-307, is determined by a synchronous counter 350 which generates the DRA 0-8 address signals and is coupled to the address terminal of each TSI 0-7 300-307 via a buffer 351, the buffer 351 being enabled by the clock signal CLK during the positive half of CLK. Also, during the positive half of CLK, when FLAG is set by switch controller 40 and when CRA 0-8 is equal to CMP 0-8, control data is written into a control RAM 352 in the address specified by the address signal CRA0-8 from synchronous counter 350. The control RAM 352 of the preferred embodiment is a 13×512 static RAM. The control data stored in the control RAM 352 contains the TSI data RAM read address (DRA 0-8), the outbound data bus (DRA 9-11), and a connect bit for the quiet termination buffer (DRA 12). During the second half (or low portion) of the CLK signal, the control RAM 352 is read. The data read from the control RAM 352 contains data to select one of the 512 location of each data RAM 300-307 via the address line (DRA 0-8) and also includes the 3 bits DRA 9-11 for selecting one of the eight data RAMS 300-307 to be enabled onto the outbound bus associated with the switch 30. The output of decoder 353 generates enable signals $\overline{OBEN}$ 0-7 for enabling one of output latches 360-367 shown in FIG. 8A. The DRA 12 bit is also output from the control RAM which enables latch 368 for providing a fixed output (i.e., quiet termination) for disconnected ports on the outbound bus in order to properly interface with a CODEC. Enable signal $\overline{OBE}$ $\overline{N}$ enables the outbound bus latch 369 and is provided as a control input signal from switch controller 40. Each switch receives control information (SDAT 0-7 and SADD 0-9) from switch controller 40. A latch network 354 is provided for receiving control information from switch controller 40, including information to be stored in the control RAM (TAD 0-12) the output enable signal ($\overline{OBEN}$), the time slot of the data to be outputted (CMP 0-8), and a read/write flag (FLAG) indicating a read or write of the control RAM 352. A buffer 355 receives the SADD 0-9 data from the switch controller 40. SADD 4-7, which specifies the switch address, is coupled to a comparator 356 for comparing the specified switch number with the hard-wired switch ID number SID 0-3. The output of comparator 356 is a logic 1 for the specified switch 30 which enables decoder 357 to decode the specific functions specified by control signals SADD 0-2. The output of decoder 357 is enable signals which are coupled to latch network 354 for receiving the control data from switch controller 40 in the respective latches.

Figure 9:
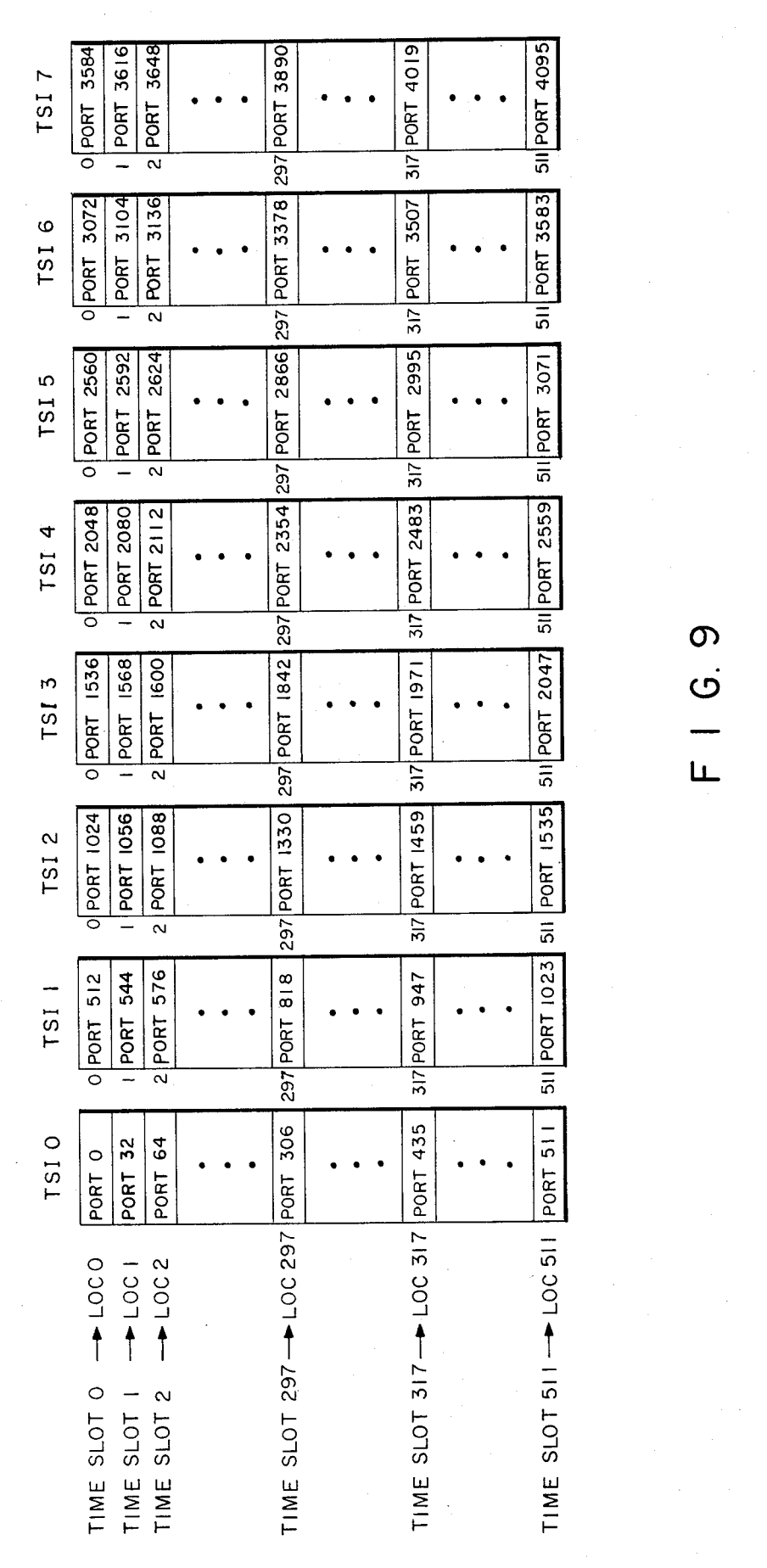

An example of establishing a link between the ports is given with the aid of FIG. 9. Assume for purposes of example that port 947 is to be linked with port 3378. The synchronous counter 350 of each switch counts from 0 to 511, the value of the synchronous counter 350 corresponding to a time slot, the time slots of each switch 30 being synchronized. As explained above in conjunction with the switch I/O 20/port subsystem 10 interface, at time slot 317 the data from port 435 will be written into location 317 of TSI0 300, the data from port 947 will be written in location 317 of TSI1 301, ... and the data from port 4019 will be written into location 317 of TSI7 for each switch 30. The loading of the data into the respective TSIs occurs during the first half (or positive half) of the CLK signal as described above. The contents will be the same for all eight TSIs for all eight switches 30. During the second half of the CLK signal, for switch 6 only, and at a time slot of 297, a data RAM address (DRA 0-8) of 317 is inputted to the control RAM 352 along with the output bus enable signals for enabling TSI1 (i.e. $\overline{OBEN1}$). Thus, on the next cycle during time slot 297, the control RAM data in location 297 will be read out for switch 6 and point to location 317. Location 317 will be read for all eight TSIs of switch 6, however only the TSI1 output will be enabled onto outbus 6. This data is the data inputted from port 947 and is outputted onto OUTBUS 6 from switch 6, and occurs at time slot 297. This time slot for switch 6 corresponds to port 3378 which is the port desired to be linked with port 947. The writing of the control RAM 352 and the data written into the control RAM 352 is controlled by the switch controller 40 via the switch control bus 41. In a similar fashion, the link between any two ports is made. As described above, once the SBY switch 30 is substituted for a primary switch, the operation of the SBY switch operates as though it were a primary switch as described above, the above example can also be applied to the standby switch.

Figure 10:
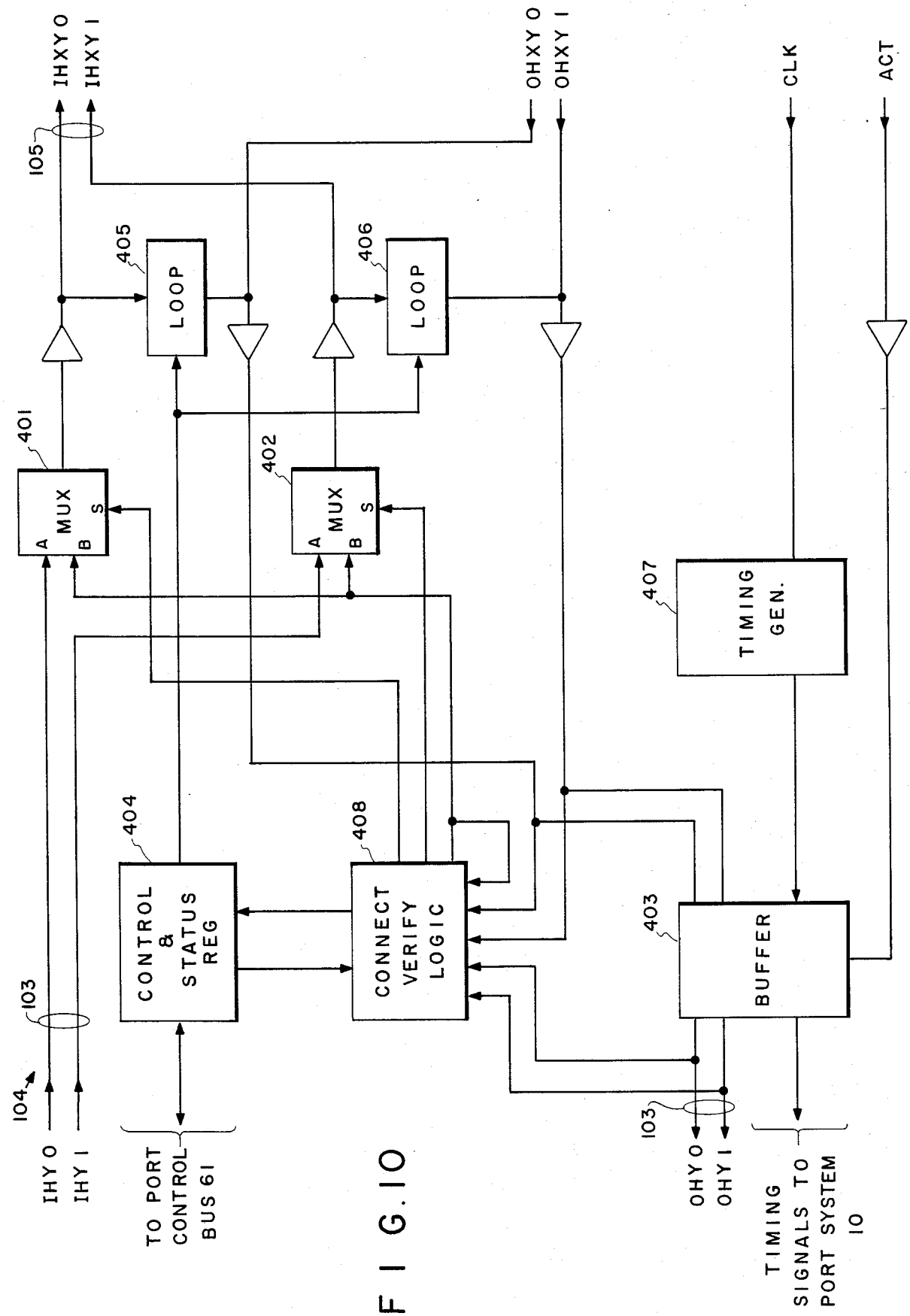
FIG. 10 shows a functional block diagram of a highway select unit of the preferred embodiment of the present invention.

Referring to FIG. 10 there is shown a block diagram of the highway select unit 104 of the port subsystem 10. The input serial data received via the port data highway 103, IHY0 and IHY1, is transmitted to the switch data highway 105, IHXY0 and IHXY1, through a first multiplexer MUX 401 and a second MUX 402, respectively. Outbound serial data (OHXY0, OHXY1) received from the corresponding switch I/O 20 is coupled to the port subsystem 10 via port data highway 103 (OHY0, OHY1) through a buffer 403. Control and status registers 404 are provided by the highway select unit 104 for interfacing with the port controller 60 via the port control bus 61 to receive control and status information. Loop units 405, 406, controlled from information contained in the control and status registers 404, are provided for looping data on the inbound switch data highway 105 to the associated outbound switch data highway (i.e., IHXY0 is looped to OHXY0, or IHXY1 is looped to OHXY1). The ACT signal described above in conjunction with FIG. 7, is received from the corresponding switch I/O 20 and enables the buffer 403 for the active highway select unit 104. A timing generator 407 generates the timing signals from the input CLK signal. The timing signals provide the time slot assignment for the ports of the port subsystem 10, the timing signals being transmitted to the corresponding port subsystem 10 via buffer 403.

A connect verification logic unit 408 is provided for verifying test data through the digital switch system 1. The connect verification logic unit 408 interfaces with the control and status registers 404 for receiving and reporting control and status information from the port controller 60. Various modes are provided by the connect verification logic unit 408 for verifying the data paths of the digital switch system 1. At a predetermined time slot a fixed test data block can be inserted into the serial data of the port data highway via MUX 401, 402 controlled by the connect verification logic unit 408. The connect verification logic unit 408 thus provides a control for looping the inbound data to the outbound data terminal on the highway select unit 104 for verifying the test data block thereby being able to verify the portion of the data path included in the loop and aiding in isolating a faulted area.

The drawings of the present invention indicate the integrated circuit chip number and the numbers around the periphery of the IC designate the pin number of the IC.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A redundant digital switch matrix system comprising:
   (a) a plurality of primary digital switch means, each of said plurality of primary digital switch means operatively coupled to a corresponding number of input buses, each of said input buses transmitting input data in predetermined time slots from a second plurality of ports associated with each of said input buses, and each of said primary digital switch means having an output bus for transmitting output data, each output bus being associated with one of said input buses and each output bus transmitting output data to the second plurality of ports associated therewith;
   (b) a standby input bus, adapted to receive the input data from a selected one of said input buses in response to at least one select control signal, said standby bus further operatively coupled to each of said plurality of primary digital switch means; and
   (c) a standby digital switch means, operatively coupled to the corresponding number of input buses and further operatively coupled to the standby input bus, and further having an output bus to transmit output data;
   wherein each primary digital switch means and the standby digital switch means includes:
   switching means for altering the switch matrix system configuration in response to at least one of said select control signals to enable the standby digital switch means to receive the input data from said input buses and said standby input bus, to effectively decouple a preselected one of said plurality of primary digital switch means from said input buses and said standby input bus, to enable the standby input bus to receive the input data from the second plurality of ports associated with the preselected one of said primary digital switch means, and to enable the output bus of said standby digital switch means to transmit the output data to the plurality of ports associated with the preselected one of said primary digital switch means, thereby effecting a substitution of said standby digital switch means for any one of said plurality of primary digital switch means.

2. In a redundant digital switch matrix system having a plurality of primary digital switch means, each of said plurality of primary digital switch means operatively coupled to a corresponding number of input buses and a standby input bus, each of said input buses transmitting input data in predetermined time slots from a second plurality of ports associated with each of said input buses, and each of said primary digital switch means having an output bus for transmitting output data, each output bus being associated with one of said input buses and each output bus transmitting output data to the second plurality of ports associated therewith, said standby input bus adapted to receive the input data from a selected one of said input buses in response to at least one select control signal, said digital switch matrix system further having a standby digital switch means, operatively coupled to the corresponding number of input buses and further operatively coupled to the standby input bus, and further having an output bus to transmit output data;
   wherein each primary digital switch means and the standby digital switch means comprises:
   (a) a plurality of input buffers, each input buffer operatively coupled to a corresponding input bus in response to a corresponding first select control signal;
   (b) a plurality of second input buffers, each second input buffer operatively connected to the standby bus in response to a corresponding second select control signal;
   (c) a plurality of memory means, each memory means having an input terminal adapted to receive input data and each memory means having an output terminal adapted to transmit output data, the input terminal of each memory means operatively coupled to a corresponding first input buffer and a corresponding second input buffer, each output terminal operatively coupled to output bus, for storing input data received from the corresponding input bus or standby bus;
   (d) comparator means, having a first set of input terminals adapted to receive a predetermined digital switch means number and having a second set of input terminals adapted to receive a switch number control signal, for comparing said predetermined digital switch means number and said switch number control signal to generate an enable signal;
   (e) decoder means, having input terminal adapted to receive said switch number control signal, and operatively coupled to said comparator means, for decoding said switch number control signal in response to said enable signal to generate the first and second select control signals, the first and second select control signal effectively coupling each primary digital switch means to the input buses and effecting a substitution of said standby digital switch means for any one of said primary digital switch means; and (f) control memory means, having an input terminal adapted to receive a clock signal for determining the current time slot, each time slot corresponding to an address location of each of said memory means, said control memory means operatively connected to said plurality of memory means, for storing control data to selectively output data stored in said memory means during a second predetermined time slot corresponding to a receiving port.

* * * * *